United States Patent [19]

Su et al.

[11] Patent Number: 4,943,425

[45] Date of Patent: Jul. 24, 1990

[54] METHOD OF MAKING HIGH PURITY DENSE SILICA OF LARGE PARTICLE SIZE

[75] Inventors: Sophia R. Su, Weston; Leo F. Fitzpatrick, Sandwich, both of Mass.

[73] Assignee: GTE Laboratories Incorporated, Waltham, Mass.

[21] Appl. No.: 176,583

[22] Filed: Apr. 1, 1988

[51] Int. Cl.$^5$ .................................. C01B 33/02
[52] U.S. Cl. ................................. 423/338; 423/339
[58] Field of Search ........................... 423/338, 339

[56] References Cited

U.S. PATENT DOCUMENTS

| | | | |
|---|---|---|---|
| 2,974,105 | 3/1961 | Iler | 252/309 |
| 3,311,481 | 3/1967 | Sterry et al. | 106/57 |
| 3,538,015 | 11/1970 | Mindick et al. | 252/313 |
| 4,059,658 | 11/1977 | Shoup et al. | 264/43 |
| 4,246,139 | 1/1981 | Witt | 252/451 |
| 4,301,034 | 11/1981 | McDaniel | 423/338 |
| 4,327,065 | 4/1982 | Dardel et al. | 423/338 |
| 4,339,559 | 7/1982 | McDaniel | 423/338 |
| 4,426,216 | 1/1984 | Satoh et al. | 65/18.1 |
| 4,432,956 | 2/1984 | Zarzycki et al. | 423/338 |
| 4,436,542 | 3/1984 | Kurosaki | 65/18.1 |
| 4,560,399 | 12/1985 | Luong | 65/18.1 |
| 4,574,063 | 3/1986 | Scherer | 264/60 |
| 4,666,692 | 5/1987 | Taramasso et al. | 423/339 |
| 4,680,049 | 7/1987 | Onorato et al. | 65/18.1 |

FOREIGN PATENT DOCUMENTS

| | | | |
|---|---|---|---|
| 0030713 | 2/1984 | Japan | 423/338 |
| 2171914 | 7/1987 | Japan | 423/339 |

OTHER PUBLICATIONS

Sumio Sakka, *Gell Method for Making Glass*, Treatise on Materials Science and Technology, vol. 22, Glass III, 1982, pp. 129–165.
Wood, Rabinovich, Johnson, Jr., MacChesney, and Vogel, *Preparation of High-Silica Glasses from Colloidal Gels: I, Preparation for Sintering and Properties of Sintering Glasses*, Journal of the American Ceramic Society, vol. 66, No. 10, Oct. 1983, pp. 683–699, discusses a new method for preparing fused silica and high-silica glasses through the sol-gel process.
Jones, Emblem, and Hafez, *Formation of Glass-Like Materials from Ethyl Silicate*, proceeding of the second international workshop on glasses and glass ceramics from gels, Wurgburg, Jul. 1983, pp. 1–12.
Hanawa, Sudo, Kawachi, and Nakahara, *Fabrication of completely OH-Free V.A.E. Fibre*, Elec. Ltrs., vol. 16, No. 18, Aug. 28, 1980, pp. 699–700.
Brinker, Keefer, Schaefer and Ashley, *Sol-Gel Transition in Simple Silicates*, Journal of Non-Crystalline Solids, 48 (1982) pp. 47–64.
Rabinovich, Johnson, MacChesney and Vogel, *Preparation of Transparent High-Silica Glass Articles from Colloidal Gels*, Journal of Non-Crystalline Solids, 47 (1982), pp. 435–439.
Susa, Matsuyame, Satoh, and Suganuma, *New Optical Fibre Fabrication Method*, Electronics Letters, 18, p. 499 [1982].
Tran and Koo, *Couplers by Using Gel Glass*, Electronic Letters, 5 Mar. 1981, vol. 12, No. 5, pp. 187–188.
Prassas, Phalippou, and Zarzychi, *Monolithicity of Silica Gels*, J. Phys., Colloq. 1982, No. 09, pp. 257–260.
Nogami and Moriya, *Glass Formation Through Hydrolysis of $Si(OC_2H_5)_4$ with $NH_4OH$ and HCl Solution*, Journal of Non-Crystalline Solids 37 (1980), pp. 191–201.
Sakka and Kamiya, *The Sol-Gel Transition in the Hydrolysis of Metal Alkoxides in Relation to the Formation of Glass Fibers and Films*, Journal of Non-Crystalline Solids 48 (1982) pp. 31–46.
Yamane, Aso, and Sakaino, *Preparation of a Gel from Metal Alkoxide and its Properties as a Precursor of Oxide Glass*, Journal of Material Science, vol. 13 (1978) pp. 865–870.
Gavaghan, *Taking the Heat Out of Glass Making*, New Scientist, Apr. 11, 1985, p. 25.
Harmer, Puyane and Gonzalez-Oliver, *The Sol-Gel Method for Optical Fiber Fabrication*, IFOC, Nov./Dec. 1982, pp. 40–44.
Satoh, Sua, Matsuyama and Suganuma, *Effect of Atmosphere on Porous Gel Sintering*, Journal of Non-Crystalline Solids 55 (1982) pp. 455–457.
Matsuyama, Susa, Satoh, and Suganuma, *Synthesis of High-Purity Silica Glass by the Sol-Gel Method*, Ceramic Bulletin, vol. 63, No. 11 (1984), pp. 1408–1411.
Yamane, Aso, Okano, and Sakaino, *Low Temperature Synthesis of a Monolithic Silica Glass by the Pyrolysis of a Silica Gel*, Journal of Materials Science, 14 (1979) pp. 607–611.
Kawaguchi, Hishikura, Iura, and Kokubu, *Monolithic Dried Gels and Silica Glass Prepared by the Sol-Gel Process*, J. Non-Cryst. Solids 1984, vol. 63, No. 1–2, pp. 61–69.
Yamane, Inoue, Yasuori, *Sol-Gel Transition in the Hydrolysis and Silica Methoxide*, J. Non-Cryst. Solids 1984, vol. 63, No. 1–2, pp. 13–21.

(List continued on next page.)

Primary Examiner—Robert L. Stoll
Assistant Examiner—Lori F. Cuomo
Attorney, Agent, or Firm—Frances P. Craig; Ivan L. Ericson

[57] ABSTRACT

A method of making high purity, dense silica of large particles size is described. Tetraethylorthosilicate is mixed with ethanol and is added to a dilute acid solution having a pH of about 2.25. The resulting solution is digested for about 5 hours, then 2N ammonium hydroxide is added to form a gel at a pH of 8.5. The gel is screened through an 18–20 mesh screen, vacuum baked, calcined in an oxygen atmosphere and finally heated to about 1200° C. in air to form a large particle size, high purity, dense silica.

9 Claims, No Drawings

OTHER PUBLICATIONS

Dislich, *Glassy and Crystalline Systems from Gels: Chemical Basis and Technical Application,* Journal of Non-Crystalline Solids 57 (1983) pp. 371–388.

Sakka, Kamiya, Makita and Yamamoto, *Formation of Sheets and Coating Films from Alkoxide Solutions,* Journal of Non-Crystalline Solids 63 (1984) pp. 223–235.

Zelinski and Uhlann, *Gel Technology in Ceramics,* Journal Phys, Chem. Solids, vol. 45, No. 10, pp. 1069–1089.

W. Stober, A. Fink, E. Bohn, *Controlled Growth of Mono-Disperse Silica Spheres in the Micron Size Range,* J. Colloid and Interface Science, 26, 62–69 (1968).

E. Barringer, N. Jubb, B. Fegly, R. Pober, H. Bowen, *Processing Monosized Powders,* Ultrastructure Processing of Ceramics, Glasses, and Composites, Ch. 26, 315–333 (1984).

Mitsubishi Metal Corp. *High-Purity Crucible,* Ceramic Industry, p. 3 (Jan. 1988), Japan.

Kline & Co. *Opportunities in Specialty Silicas,* pp. 1–7 (1987).

"The Chemistry of Silica by R. K. Iler" pp. 312 to 331 and pp. 554 to –568.

R. K. Iler, Journal of Colloid and Interface Science, vol. 57, No. 1, May 1980.

METHOD OF MAKING HIGH PURITY DENSE SILICA OF LARGE PARTICLE SIZE

CROSS REFERENCE TO RELATED APPLICATION

A co-pending patent application, Ser. No. 176,582, filed concurrently herewith entitled "METHOD OF MAKING LARGE PARTICLE SIZE, HIGH PURITY, DENSE SILICAS", and assigned to GTE Laboratories Incorporated assignee of the present application, concerns related subject matter of this application.

FIELD OF THE INVENTION

This invention relates to a method of making silica. More particularly, this invention relates to a method of making high purity, dense silica of large particle size.

BACKGROUND OF THE INVENTION

There is a pressing commercial and industrial demand for ultra pure, dense, large particle size silica having physical properties essentially the same as natural sand.

Many researchers have produced synthetic silica. For example, monodispersed silica powder has been prepared by a number of researchers. The Stober process was based on the controlled growth of spherical silica particles of uniform size, W. Stober, A. Fink and E. Bohn, Journal of Colloid and Interface Science 26, 62-69 (1968). The process included hydrolytic decomposition of tetraalkyl silicates (methyl or ethyl) and subsequent condensation of silicic acid in an alcoholic solution. Ammonia was used as a morphological catalyst. Particle size obtained in suspension ranged from less than 0.5 micrometers to 2 micrometers in diameter. By modifying the hydrolysis conditions, B. Fegley produced monosized $SiO_2$ powders with an average diameter of 0.55 micrometers, E. Barringer, N. Jubb, B. Fegley, R. L. Poker and H. K. Bowen, Ultrastructure Processing of Ceramics, Glasses, and Composites, 1984, pp. 315-333.

The polymerization of the dilute silicic acid solution through nucleation, and growth of silica particles in the presence of alkali salts or molybdic acid has been extensively studied by Iler and other groups, see R. K. Iler, Journal of Colloid and Interface Science, Vol. 75, No. 1, 1980, and "The Chemistry of Silica" by R. K. Iler, John Wiley & Sons Inc., (1979). Alexander and Iler reported the method of addition of alkalized acid sol, containing 2.4% silica to an alkaline sol containing 30% silica, the average diameter of silica particles increased to a final value of 60 micrometers from less than 45 micrometers in size.

U.S. Pat. No. 3,440,170 discloses a silica sol containing nonaggregated, uniform, spherical silica particles having a weight-average particle diameter of about 45-100 micrometers and a method of producing the sol by providing an alkaline silica sol containing silica particles having a weight-average diameter of about 10-30 micrometers.

U.S. Pat. No. 3,538,015 discloses the method to produce silica sols having water as the continuous phase and containing 30-70% by weight of uniform, nonaggregated silica particles having increased in diameter 2.5 to 4.0 times the original particle.

The aforementioned patents relate to the preparation of concentrated stable silica sols containing particles having a size from two to four times greater than those of original diluted sols. In addition, these sols contain trace amount of alkali metals or other foreign elements as stabilizers. The synthesis of ultra pure, dense, large particle size silica has not been reported In the present invention, we describe the method to prepare high purity, large particle size silica by hydrolytic decomposition of tetraalkyl orthosilicates.

SUMMARY OF THE INVENTION

In accordance with one aspect of the present invention, a new and improved method for making large particle size, high purity, dense silica comprises the following steps:

Step 1—Tetraalkylorthosilicate is homogeneously mixed with a solvent to form a solution having a molar ratio of tetraalkylorthosilicate to the solvent of about 1 to about 3.

Step 2—The product of step 1 is added to a dilute acid solution.

Step 3—The product of step 2 is digested.

Step 4—Ammonium hydroxide is added to the product of step 3 to form a gel containing water and the solvent.

Step 5—The product of step 4 is screened to form a granulated gel containing water and ethanol.

Step 6—The product of step 5 is heated under vacuum for a period sufficient to remove any contained water and the solvent from the product of Step 5 to form a dehydrated product.

Step 7—The product of step 6 is heated to form a large particle size, high purity, dense silica having a particle size from about 100 micrometers to about 420 micrometers.

DETAILED DESCRIPTION OF THE PREFERRED EMBODIMENTS

One example of the new and improved method for making large particle size, high purity, dense silica comprises the following steps:

Step 1—Tetraethylorthosilicate is homogeneously mixed with ethanol to form a solution having a molar ratio of tetraethylorthosilicate to ethanol of about 1 to about 3.

Step 2—The product of step 1 is added to a dilute acid solution having a pH of about 1.0 to about 4.0, preferably 2.25, while maintaining the dilute acid solution at a temperature equal to or below 40° C.

Step 3—The product of step 2 is digested with stirring for a period of about 5 hours.

Step 4—2N ammonium hydroxide is added to the product of step 3 to form a gel containing water and ethanol at a pH of about 6.6 to about 9.0, preferably about 8.5.

Step 5—The product of step 4 is screened through a 18-20 mesh screen to form a granulated gel containing water and ethanol.

Step 6—The product of step 5 is vacuum baked at a temperature and for a period sufficient to remove any contained water and ethanol from the product of Step 5 to form a baked product.

Step 7—The product of step 6 is calcined at a temperature of about 600° C. in an oxidizing atmosphere for a period of about 3 hours to form a calcined product.

Step 8—The product of step 7 is heated at a temperature of about 1200° C. in an air atmosphere for a period of about 4 hours to form a large particle size, high purity, dense silica. The silica has a density from about 2.19 g/cc to about 2.21 g/cc, a particle size from about 100 micrometers to about 420 micrometers, and a Al, Ca, Fe, Na, K, Li combined content of less than 1.50 ppm.

The formation of pure silica gel involves a polymerization mechanism in which three essential stages are involved:

(a) polymerization of monomer to form primary particles;
(b) growth of the particles formed; and
(c) linking of these particles together in chains, then into three-dimensional networks.

The polymerization reaction is based essentially on the condensation of silanol (Si-OH) groups after the initial formation of $Si(OH)_4$ by acidic hydrolytic decomposition of $Si(OC_2H_5)_4$.

At low pH, particle growth stops once the size of 2 to 4 micrometers is reached. However, by changing the pH, the sol can be destabilized and colloided to form continuous networks leading to a gel with a higher silica concentration.

This invention is based on the theory mentioned above. The method of synthesizing high purity, large particle size silica is described as follows:

Silicon alkoxides, $Si(OR)_4$, ($R=CH_3$, $C_2H_5$) are hydrolyzed readily with water in the presence of an acid catalyst to form a sol containing particles of silicic acid, $Si(OH)_4$. By changing the pH of the sol, the sol is destabilized. As a result, the particles collide and form by aggregation continuous networks leading to gels. Silica powder can be formed by removing the $H_2O$ and solvent from these gels. High purity tetraalkylorthosilicates such as tetramethylorthosilicate and tetraethylorthosilicate can be employed to produce large size, high purity, dense silica. Tetraethylorthosilicate was the preferred material in the method of this invention. Concentrated reagent grade $NH_4OH$ and high purity concentrated $HNO_3$ and denatured or anhydrous ethanol were used in this invention. All reactions were carried out in polypropylene labware to prevent contamination by impurities. Processing parameters, controlling the particle size, density and surface area, were systematically studied and optimized. A small batch process was used to produce 100 grams of $SiO_2$.

Acid Hydrolyzed Synthetic Silica

Example 1

Procedures: batch process, theoretical yield of each batch: 113 grams based on 420 ml of tetraethylorthosilicate (TEOS).

1. TEOS (420 ml) with ethanol (330 ml) [molar ratio of TEOS/ethanol=⅓] were homogeneously mixed in a separatory funnel.
2. Dropwise addition of the product of (1) was made to 300 ml of acidic $H_2O$ (pH=2.25, 2 ml of 1N $HNO_3$ in 300 ml D.I. $H_2O$). The temperature of the reactor was kept at or below 40° C. It required 60 to 90 minutes to complete the addition.
3. The reaction mixture was agitated with a mechanical stirrer and was digested for five hours.
4. 35 ml of 2N $NH_4OH$ was added to (3) with vigorous stirring. The sample gelled immediately. (pH of the mixture at the gelling point was 8.6.)
5. 12 to 15 v/o of the mother liquor was recovered after the gelled sample had been settled for 1½ hours.
6. The mother liquor (pH=8.3 to 8.6) was analyzed for unreacted TEOS by gas chromatography HP5710A/mass spectrometer HP5980A (A SP 1000 Carbopack B capillary column at 200° C. isotherm and He as the carrier gas were used). No indication of TEOS was found in the mother liquor. TEOS was completely hydrolyzed under the reaction condition and a polymeric silicic acid network was formed.
7. The gel from (4) was mechanically crushed through an 18–20 mesh screen.
8. The product from (7) was vacuum baked at 275° C. to remove $H_2O$ and ethanol.
9. The product from (8) was calcined at 600° C. in a flow of oxygen and held at 600° C. for 3 hrs.
10. The product of (9) was densified at 1200° C. in air, and held at 1200° C. for 4 hrs., then cooled to room temperature.

The density of the resulting silica is in the range of 2.19 g/cc to 2.21 g/cc (Theoretical density of amorphous silica: 2.17–2.20 g/cc). The tap density of the powder is from 58% to 65% of true density. The overall yield is over 95%. Chemical analyses and physical characteristics of the powder are tabulated in Table I.

Example 2 – Example 7

Acid hydrolyzed calcined silica was prepared according to Example 1. Densification studies of this powder were conducted at different temperatures and in different atmospheres. The density of the densified powder was then measured by a glass Pycnometer (ASTM D153). Results, tabulated in Table II, indicate that this sol-gel silica can be fully densified at 1150° C., and that the atmospheric environment has no effect on the densification process.

TABLE I.

Chemical Analyses and Physical Characteristics of Acid Hydrolyzed Silica

A. Chemical Analyses:

| Element | PPM |
|---|---|
| Al | 0.075–0.50 |
| Fe | 0.005–0.20 |
| Ca | 0.06 –0.08 |
| Ti | 0.3 |
| Cr | ND < 0.04 |
| Ni | ND < 0.02 |
| Na | 0.4–0.6 |
| K | 0.05 |
| Li | 0.05 |

B. Density:
 2.198 = 2.209 g/cc
 (Theoretical Density of Amorphous Silica: 2.170–2.200 g/cc)
C. Tap Density:
 1.29–1.44 g/cc
 (58.4%–65.2%)
D. Surface Area:
 0.088–0.20 m²/g
E. Particle Size:
 Mean:   186 μm
 Median: 213 μm

TABLE II.

Densification Study of Calcined Silica

| Example | Sample Weight (g) | Temp. (C.) | Densifying Time (hrs) | Atmosphere | Density g/cc |
|---|---|---|---|---|---|
| 2. | 70 | 1200° C. | 2 | Air | 2.19 |
| 3. | 30 | 1200° C. | 1 | Air | 2.18 |
| 4. | 50 | 1150° C. | 2 | Air | 2.19 |
| 5. | 20 | 1150° C. | 1 | Air | 2.18 |
| 6. | 40 | 1200° C. | 2 | He | 2.20 |

TABLE II.-continued
Densification Study of Calcined Silica

| Example | Sample Weight (g) | Temp. (C.) | Densifying Time (hrs) | Atmosphere | Density g/cc |
|---|---|---|---|---|---|
| 7. | 20 | 1200° C. | 1 | He | 2.18 |

Example 8

This example was the same as Example 1 except that the gelled sample was dried in an oven at 150° C. prior to calcination at 600° C. in $O_2$. No vacuum bake was performed. Trace amounts of carbonaceous residue were noted after the densification step. It indicated that the decomposed organic matter was encapsulated inside the pores.

Example 9

This example was the same as Example 8 except that the calcination schedule was modified. TEOS (210 ml) was homogeneously mixed with ethanol (165 ml). The ethanol solution of TEOS was then added to 150 ml of acidic water (pH=2.25). The mixture was agitated with a mechanical stirrer at 40° C. or below for 5 hrs. Gellation was performed with 17 ml of 2N $NH_4OH$ at ambient temperature (pH=8.3-8.5). The gelled sample was settled for 2 hrs prior to the recovery of mother liquor. After sieving the sample through 18-20 mesh screen and air drying, the granulated sample was calcined in an oxygen atmosphere at the following schedule: 250° C. soaked for 3 hrs; 680° C. soaked for 3 hrs. Densifying in air was subsequently followed at 1200° C. for 2 hrs. The silica so prepared has a true density of 2.20 g/cc, no black specks (carbonaceous residue) were noted.

Examples 10-13

A systematic gellation study was conducted to understand the effect of pH on the formation of black specks after densifying. The ethanol (165 ml) solution of TEOS (210 ml) was added dropwise to 150 ml of acidic $H_2O$ at pH 2.25. The mixture was agitated with a mechanical stirrer and digested for 5 hrs at 40° C. or below. 1 ml of 2N $NH_4OH$ was then added to the reaction mixture to reach a pH of 5.5. The mixture was stirred at this pH for 30 minutes prior to gellation. Results of these are tabulated as follows:

| Example | Additional Amount of 2N $NH_4OH$(ml) Added | Time (min) Required to Gel | pH at Gellation | *Density g/cc after Densifying |
|---|---|---|---|---|
| 10. | 35 | 1 | 9.0 | 2.18 |
| 11. | 17 | 1 | 8.5 | 2.22 |
| 12. | 5 | 4 | 7.6 | 2.18 |
| 13. | 1 | 15 | 6.6 | 2.20 |

*Theoretical Density of Amorphous Silica: 2.17-2.20 g/cc

After gelling the sample was settled for 2 hrs prior to mechanically screening. The gelled particles were air dried, then calcined in $O_2$ at 250° C. for 3 hrs, 680° C. for 3 hrs, followed by densifying at 1200° C. for 2 hrs in air. These densified powders have considerably less carbonaceous residue as compared to the silica obtained from Example 8. This implies that homogeneously gelling coupled with soaking at low temperature are required to complete the removal of organic matter.

Examples 14-15

The hydrolysis and gellation parameters were kept constant; the calcination condition was varied slightly. The effect of calcination on the density and physical characteristics of silica was studied. The ethanol (165 ml) solution of TEOS (210 ml) was added to 150 ml of acidic $H_2O$ at pH 2.25. The mixture was agitated for 5 hrs at 40° C. or below. 1 ml of 2N $NH_4OH$ was added to the reaction mixture to reach a pH of 5.5. The mixture was stirred for 10 minutes prior to the addition of 5 ml of 2N $NH_4OH$ (pH at gellation was 7.6). After screening, the gelled particles were calcined in the following tabulated conditions, followed by densifying at 1200° C. in air for 2 hrs.

| Example | Calcination Condition in $O_2$ | Physical Appearance | Density g/cc |
|---|---|---|---|
| 14. | Air Dry<br>250° C. or 3 hrs<br>680° C. for 3 hrs | Detectable black specks | 2.19 |
| 15. | Vacuum bake at 275° C.<br>Calcined in $O_2$ at<br>250° C. for 3 hrs<br>680° C. for 3 hrs | No black specks | 2.21 |

Example 16

The ethanol (330 ml) solution of TEOS (420 ml) was added to 300 ml of acidic $H_2O$ at pH 2.25. The mixture was agitated for 5 hrs at 40° C. or below. 20 ml of 2N $NH_4OH$ was added to gel the particles (pH at gellation was 7.9). After screening through an 18 mesh nylon screen, the sample was air dried briefly and then calcined in $O_2$ at 250° C. for 3 hrs, 680° C. for 3 hrs, followed by densifying at 1200° C. for 2 hrs. No noticeable black specks were found.

Example 17

This example was the same as Example 1 except that 330 ml of ethanol was replaced by the same amount of neutralized mother liquor. After densifying at 1200° C. for 2 hrs, the silica has a density of 2.23 g/cc. The overall yield was over 97%.

Example 18

TEOS (210 ml) was homogeneously mixed with neutralized mother liquor (165 ml). The organic mixture was then added to 150 ml of acidic $H_2O$ at pH 2.25. The reaction was digested for 5 hrs prior to gellation. 17 ml of 2N $NH_4OH$ was used to gel the particles, the pH at gellation was 8.3. After air drying, the gelled particles were calcined at 250° C. for 3 hrs and 680° C. for 3 hrs prior to densifying at 1200° C. in air. The powder so prepared has a true density of 2.20 g/cc. The overall yield was at 96.6%.

Example 19

This example was the same as Example 18 except that 12 ml of 2N $NH_4OH$ was used to gel the particles. The pH at gellation was 7.6-7.9. After densifying, the synthetic silica has a density of 2.18-2.23 g/cc. The overall yield was over 96%. The mother liquor was neutralized and recycled four times. No deterioration in the yield was noted.

The unique characteristics of the silica made in accordance with the present invention are:

| Characteristics | Values |
| --- | --- |
| High process yield with particle size 100 μm to 420 μm | 95% |
| High True Density (theoretical Density of Silica: 2.17-2.20 g/cc) | 2.198-2.209 g/cc |
| High Tap Density | 58.0-65.0% of True Density |
| Low Surface Area | 0.2 m²/g |
| Ultra High Purity | Al: 0.5 ppm<br>Ca and Fe: 0.05 ppm each<br>(Na + K + Li) 0.5 ppm |
| Carbonaceous residue | None |

The synthetic silica powder made by the method of the this invention meets the physical requirements for high purity quartz crucibles. The physical requirements of synthetic silica powder for fabricating high purity quartz crucibles are:

Particle size should be in the range of 100 micrometers to 420 micrometers. If particle size is larger than 420 micrometers, low packing density is observed. If particle size is smaller than 100 micrometers, gaseous species will be trapped inside and bubble formation occurs.

High true density and tap density, low surface area to avoid the entrapment of gaseous species inside the particle.

The OH content of the fused quartz has a direct effect on its viscosity. High OH content will lower annealing point of quartz crucible. OH content should not exceed 300 ppm.

High purity requirements are:
Al: 2.0 ppm maximum;
Ca and Fe: 0.5 ppm each maximum; and the total alkali content (Na+K+Li): 0.5 ppm maximum.

Low levels of these elements are required to avoid crucible defects (black specks, light spots and bubbles) and contamination of the silicon crystal during crystal growth.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of making silica comprising the following steps:
    Step 1—homogeneously mixing tetraalkylorthosilicate with a solvent to form a solution having a molar ratio of said tetraalkylorthosilicate to said solvent of about 1 to about 3;
    Step 2—adding the product of step 1 to an acid solution said acid solution at a pH of approximately 2.25;
    Step 3—digesting the product of step 2;
    Step 4—adding ammonium hydroxide to the product of step 3 to form a gel containing water and said solvent;
    Step 5—screening the product of step 4 to form a granulated gel containing water and said solvent;
    Step 6—heating under vacuum the product of step 5 for a period sufficient to remove any contained water and said solvent from the product of step 5 to form a dehydrated product;
    Step 7—heating the product of step 6 to form [a large particle size, high purity, dense] silica having a particle size from about 100 micrometers to about 420 micrometers and a surface area from about 0.088 to about 0.20 m²/g, said silica having an impurity content of less than 1.5 ppm.

2. A method of making [large particle size, high purity dense] silica in accordance with claim 1 wherein said tetraalkylorthosilicate in Step 1 comprises tetraethylorthosilicate.

3. A method of making [large particle size, high purity, dense] silica in accordance with claim 1 wherein said solvent in Step 1 comprises ethanol.

4. A method of making [large particle size, high purity, dense] silica in accordance with claim 1 wherein said Step 3 comprises digesting the product of Step 2 for a period of about 5 hours.

5. A method of making [large particle size, high purity dense] silica in accordance with claim 1 wherein said gel containing water and said solvent in Step 4 was formed at a pH of about 6.6 to about 9.0.

6. A method of making [large particle size, high purity, dense] silica in accordance with claim 1 wherein said Step 5 comprises screening the product of Step 4 through a 18-20 mesh screen to form a granulated gel containing water and said solvent.

7. A method of making [large particle size, high purity, dense] silica in accordance with claim 1 wherein said Step 7 comprises heating the product of Step 6 at a temperature of about 600° C. in an oxidizing atmosphere for a period of about 3 hours and then heated at a temperature of about 1200° C. in air for a period of about 4 hours to form [a high purity, dense] silica having a particle size from about 100 micrometers to about 420 micrometers.

8. A method of making [large particle size, high purity, dense] silica comprising the following steps:
    Step 1—homogenously mixing tetraethylorthosilicate with ethanol to form a solution having a molar ratio of said tetraethylorthosilicate to said ethanol of about 1 to about 3;
    Step 2—adding the product of step 1 to a dilute acid solution having a pH of about 2.25 while maintaining the dilute acid solution at a temperature equal to or below 40° C.;
    Step 3—digesting with stirring the product of step 2 for a period of about 5 hours;
    Step 4—adding 2N ammonium hydroxide to the product of step 3 to form a gel containing water and ethanol at a pH of about 8.5;
    Step 5—screening the product of step 4 through a 18-20 mesh screen to form a granulated gel containing water and ethanol;
    Step 6—vacuum baking the product of step 5 at a temperature and for a period sufficient to remove any contained water and ethanol from the product of step 5 to form a baked product;
    Step 7—calcining the product of step 6 at a temperature of about 600° C. in an oxidizing atmosphere for a period of about 3 hours to form a calcined product; and
    Step 8—heating the product of step 7 at a temperature of about 1200° C. in an air atmosphere for a period of about 4 hours to form [a high purity, dense] silica having a particle size from about 100 micrometers to about 420 micrometers and a surface area from about 0.088 to about 0.20 m²/g, said silica having a density from about 2.19 g/cc to about 2.21 g/cc, and a Al, Ca, Fe, Na, K, Li combined content being less than 1.50 ppm.

9. A method of making silica comprising the following steps:

Step 1—homogenously mixing tetraethylorthosilicate with ethanol to form a solution having a molar ratio of said tetraethylorthosilicate to said ethanol of about 1 to about 3;

Step 2—adding the product of step 1 to a dilute nitric acid solution having a pH of about 2.25 while maintaining the dilute nitric acid solution at a temperature equal to or below 40° C.;

Step 3—digesting with stirring the product of step 2 for a period of about 5 hours;

Step 4—adding 2N ammonium hydroxide to the product of step 3 to form a gel containing water and ethanol at a pH of about 8.5;

Step 5—screening the product of step 4 through a 18-20 mesh screen to form a granulated gel containing water and ethanol;

Step 6—vacuum baking the product of step 5 at a temperature and for a period sufficient to remove any contained water and ethanol from the product of step 5 to form a baked product;

Step 7—calcining the product of step 6 at a temperature of about 600° C. in an oxidizing atmosphere for a period of about 3 hours to form a calcined product; and Step 8—heating the product of step 7 at a temperature of about 1200° C. in an air atmosphere for a period of about 4 hours to form silica having a particle size from about 100 micrometers to about 420 micrometers and a surface area less than about 0.20 m$^2$/g, said silica having a density from about 2.19 g/cc to about 2.21 g/cc, and a Al, Ca, Fe, Na, K, Li combined content being less than 1.50 ppm.

* * * * *